US006404811B1

(12) United States Patent
Cvetko et al.

(10) Patent No.: US 6,404,811 B1
(45) Date of Patent: Jun. 11, 2002

(54) INTERACTIVE MULTIMEDIA SYSTEM

(75) Inventors: John F. Cvetko, Hillsboro; Ying K. Kwong, Beaverton; James F. Sandau, Dundee, all of OR (US)

(73) Assignee: Tektronix, Inc., Beaverton, OR (US)

( * ) Notice: Subject to any disclaimer, the term of this patent is extended or adjusted under 35 U.S.C. 154(b) by 869 days.

(21) Appl. No.: 08/649,889

(22) Filed: May 13, 1996

(51) Int. Cl.[7] .............................................. H04N 7/113
(52) U.S. Cl. .............................. 375/240.01; 348/14.11
(58) Field of Search .......................... 348/15, 16, 17, 348/13, 12, 7, 14, 18, 19, 14.11; 455/4.2, 5.1; 370/401, 352, 353, 354; 345/326, 328–332, 339, 340; 395/200.34–200.37; 375/240.01; H04N 7/173, 7/16

(56) References Cited

U.S. PATENT DOCUMENTS

| | | | |
|---|---|---|---|
| 4,061,880 A | 12/1977 | Collins et al. | 179/15 |
| 4,330,857 A | 5/1982 | Alvarez, III et al. | 370/104 |
| 4,332,026 A | 5/1982 | Alvarez, III et al. | 370/66 |
| 4,346,470 A | 8/1982 | Alvarez, III et al. | 370/104 |
| 4,418,409 A | 11/1983 | Queen | 370/104 |
| 4,507,781 A | 3/1985 | Alvarez, III et al. | 370/104 |
| 4,580,259 A | 4/1986 | Harada et al. | 370/58 |
| 4,686,698 A | 8/1987 | Tompkins et al. | 379/53 |
| 4,710,917 A | 12/1987 | Tompkins | 370/62 |
| 4,716,585 A | 12/1987 | Tompkins et al. | 379/202 |
| 4,847,829 A | 7/1989 | Tompkins et al. | 370/62 |
| 5,014,267 A | 5/1991 | Tompkins et al. | 370/62 |
| 5,095,504 A | 3/1992 | Nishikawa et al. | 379/162 |
| 5,220,560 A | 6/1993 | Ogasawara | 370/79 |
| 5,249,185 A | 9/1993 | Kanno et al. | 370/94 |
| 5,343,240 A | 8/1994 | Yu | 348/14 |
| 5,382,972 A | * 1/1995 | Kannes | 348/15 |
| 5,655,214 A | * 8/1997 | Mullett | 455/5.1 |

OTHER PUBLICATIONS

"C–Phone. The First Affordable, Television–Quality Desktop Video Communication System That Keeps Your Lan Free for Other Tasks." 1995 Target Technologies, Inc., Wilmington, North Carolina.

* cited by examiner

*Primary Examiner*—Young Lee
(74) *Attorney, Agent, or Firm*—Francis I. Gray

(57) ABSTRACT

An interactive multimedia audio/video communications system uses a lower data rate, non-deterministic graphics/command network having a plurality of desktop viewing stations and a network server. A separate, higher data rate, deterministic audio/video network is coupled to the plurality of desktop viewing stations using appropriate resources, such as an audio/video routing switcher and a professional disk recorder. A database contains a telephone directory so that when a user at one of the plurality of stations desires to communicate with another station, the user selects a telephone number and the server from the database determines the appropriate resources required to complete the connection. The server configures the necessary hardware via the graphics/command network to route the audio/video signals over the audio/video network from one station to the other. For conferences a quad splitter is used to combine up to four video signals into a singled composited video signal for display at the user's station. For communications with stations that exist on another node, the server communicates with the server at the other node and a codec farm is used to transfer the audio/video signals from the audio/video network of one system to the other. Thus the graphics/command network is left free for normal graphics operations once the audio/video communications has been established.

4 Claims, 7 Drawing Sheets

INTERACTIVE MULTIMEDIA SYSTEM

BACKGROUND OF THE INVENTION

The present invention relates to audio/video communication, and more particularly to an interactive multimedia system that delivers low cost, highly reliable and high quality full motion audio/video communication to a computer desktop.

Currently there are various electronic communication systems for printed material, there are conferencing and messaging capabilities in audio only systems, and there are crude audio/video communication capabilities. Such audio/video communication systems as currently exist include the Intel Pro-Share, PictureTel and C-Phone systems. These systems use a common network for both graphics/command and audio/video data. Although the C-Phone system claims to separate C-Phone traffic from other LAN traffic, it still uses a single network for both graphics/command and audio/video data.

In general different data types are involved in multimedia communication. They include machine-control information, data regarding stored media, text, graphics, photographic images, audio and video. The richness of the communication is the result of the simultaneous presentation of many data types with well-defined timing relationships. For example, a movie as a multimedia experience has audio, video and text, such as sub-titles. It is true that if the image quality is bad, it ruins the experience. However image quality is not everything: it is extremely annoying to view a foreign language movie with voice dubbing that does not match lips, or likewise sub-titles that are off in time with respect to the action.

The information content of multimedia communication per unit time, i.e., bandwidth, that the human senses reasonably consume varies over many orders of magnitude. In increasing order there is text, graphics, photographic images, audio and video. Bandwidth essentially determines the quality of each type of data, but bandwidth alone is not the whole issue. The different types of data must be received and presented to the user in well defined timing relationships. More precisely they must be isochronous in time to the extent required by the particular application.

What is desired is an interactive multimedia audio/video communication system that provides all of the desirable features of existing print, voice and video communication systems while providing up to broadcast quality video in real time.

SUMMARY OF THE INVENTION

Accordingly the present invention provides an interactive multimedia system that separates lower data rate data types, such as machine-control, information about the stored media, etc., from the higher data rate data types, such as audio and live video. A digital graphics system includes a network server that communicates over a lower data rate graphics/command network to a plurality of desktop viewing stations. The graphics/command network is also used by the network server to provide machine control commands to various hardware components of the multimedia system. A separate higher data rate audio/video network, controlled by the network server via the graphics/command network, includes a router for switching input video to different outputs. The router includes a video splitter that receives multiple video outputs from the router and returns a single composited video input to the router. Also a non-linear audio/video storage system is coupled to receive and store audio/video data from the router as well as to play back audio/video data through the router. A distribution hub is coupled between the router and the desktop viewing stations to convert and transfer audio/video signals between the stations and the router.

The objects, advantages and other novel features of the present invention are apparent from the following detailed description when read in conjunction with the appended claims and attached drawing.

DESCRIPTION OF THE PREFERRED EMBODIMENT

Figure 1:
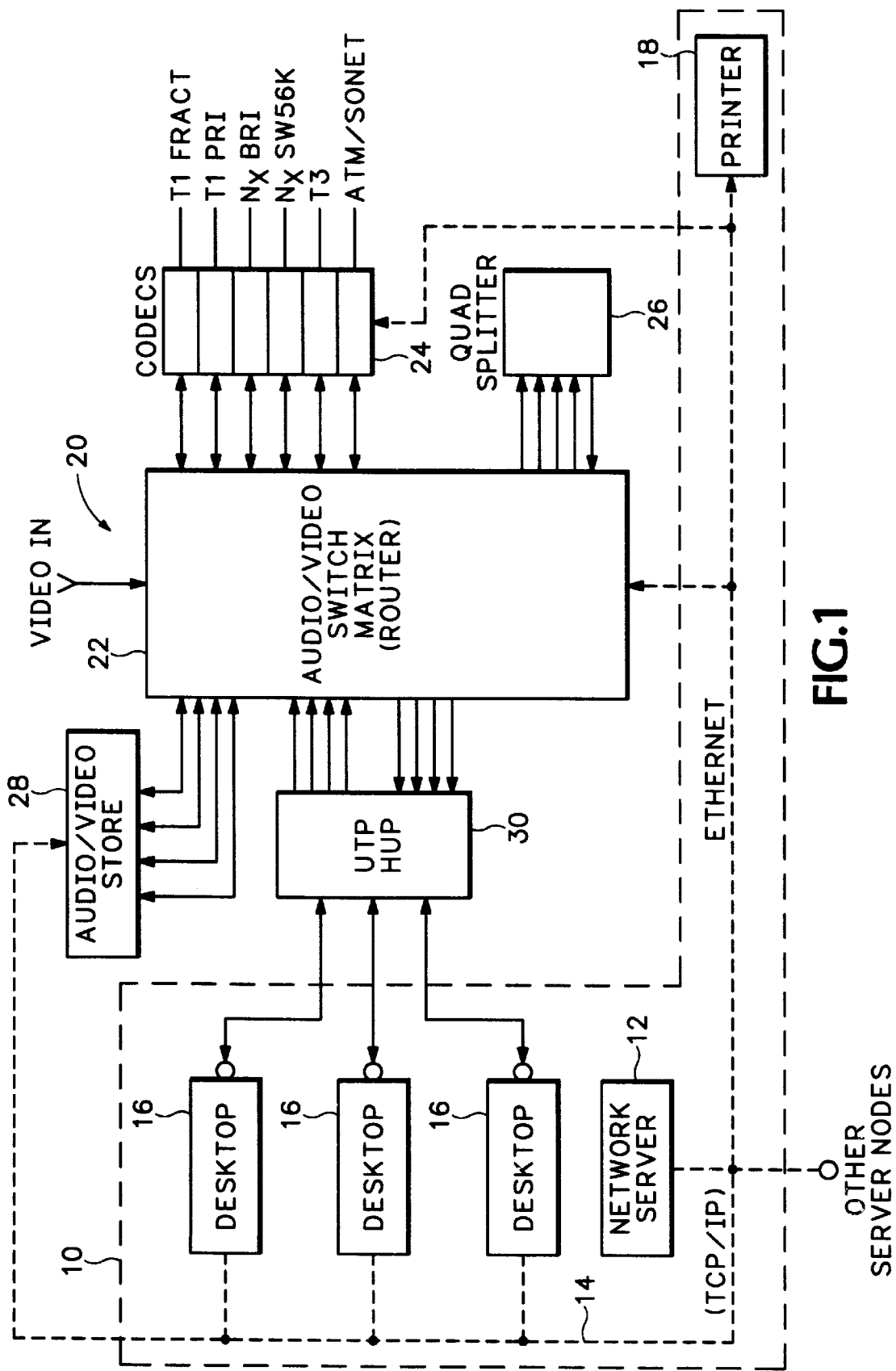
FIG. 1 is a block diagram view of an interactive multimedia system according to the present invention.

Referring now to FIG. 1 a digital graphics system 10 includes a network server (host computer) 12 that communicates over a lower data rate, shared transport, graphics/command network 14, such as Ethernet (TCP/IP) which is non-deterministic in time, to a plurality of desktop viewing stations 16, which may be personal computers, computer terminals, X-terminals, netstations or the like. Each desktop viewing station 16 typically includes a keyboard and a mouse, and may also have a touch sensitive interactive display screen. The server 12 operates under an appropriate network operating system. Also a printer 18 may be coupled to the graphics/command network 14.

A separate, higher data rate, audio/video network 20, controlled by the network server 12 over the graphics/command network 14, includes an audio/video switch matrix (router) 22 which has as direct inputs video from external sources, such as broadcast cable, satellite, video recorders or the like. The audio/video network 20 is a transport medium that is not shared and is deterministic in time. Also input to the router 22 are digital video signals via a codec farm 24 from telecommunication lines in various formats, such as T1, T3, ISDN, etc. and including ATM/Sonet. Coupled to the router 22 is a video splitter 26 which combines multiple video inputs from the router 22 into a single composited video signal which is returned as an input to the router. An audio/video storage system 28, such as a random access, non-linear, professional disc recorder (PDR), also is coupled to store audio/video data from the router 22 and to play back audio/video data through the router under control of the server 12 via the graphics/command network 14. Finally a distribution hub 30 is coupled between the router 22 and the desktop viewing stations 16 to convert and transfer audio/video signals between the router and the desktop viewing stations. Each desktop viewing station 16 includes a microphone for audio transmission and a video camera for video transmission, as well as speakers for receiving audio signals. The audio/video network 20 carries up to broadband quality video, the quality being a function of the particular application, as well as CD-quality audio signals. The graphics/command network 14 is used to communicate connection requests to the various systems, as well as provide graphics and text. The desktop viewing stations 16 may also include MPEG/JPEG compression encoders/decoders and transcoders for the video signals. Finally the network server 12 may be coupled to other server nodes via the graphics/command network 14.

Figure 2:
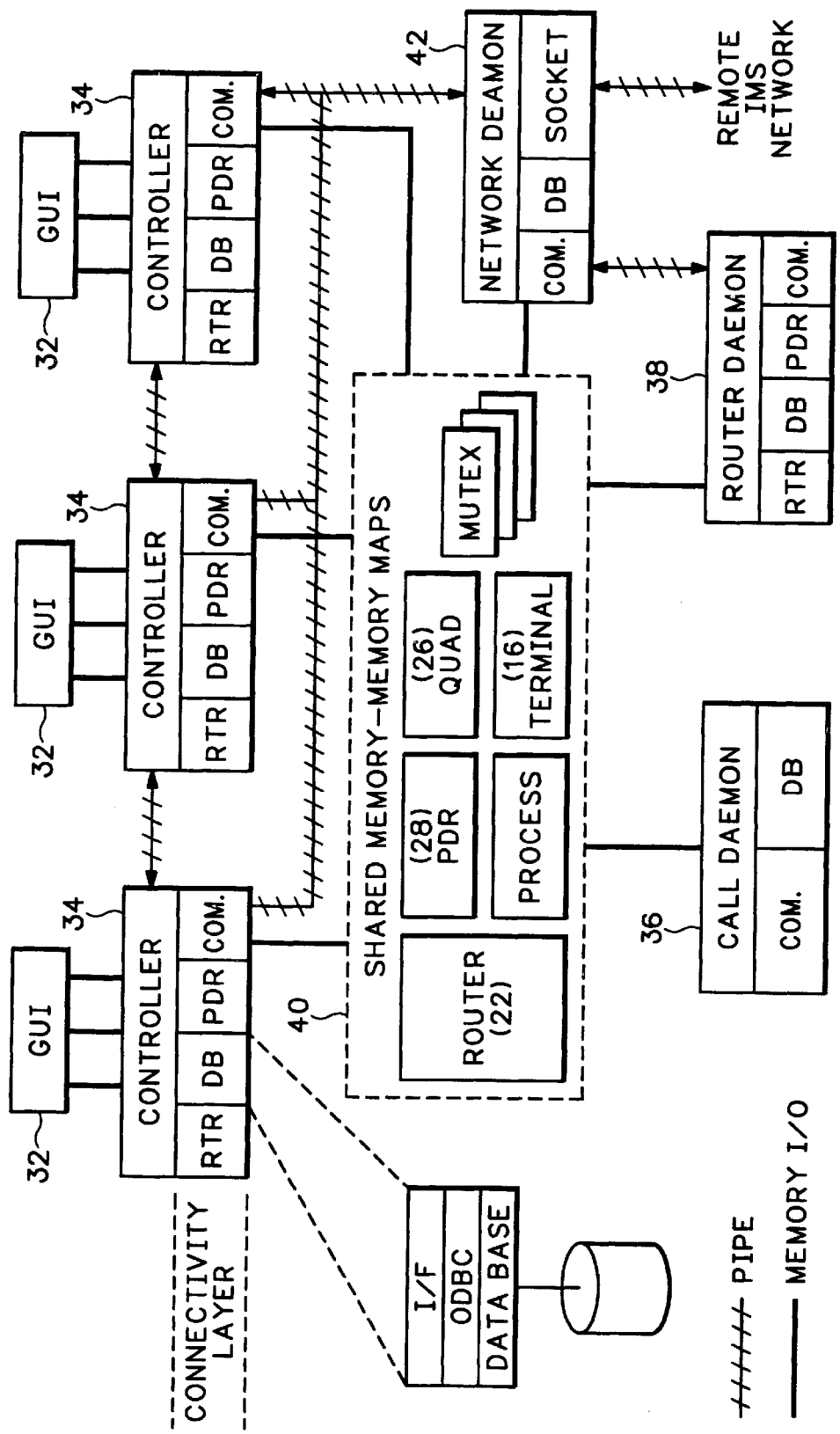
FIG. 2 is a block diagram view of a software portion of the interactive multimedia system according to the present invention.

The software on the server 12 to drive the hardware of FIG. 1 is shown diagrammatically in FIG. 2. A graphical user interface (GUI) module 32 provides an interface to the user at each desktop viewing station 16. A controller module 34 associated with each GUI 32 interprets user commands, satisfies simple requests and makes requests to more complicated tasks, determining what hardware is available. If the requisite hardware is not available, the controller module 34 returns a "resource busy" indicator. A call daemon 36 is an initialization routine which initializes the router 22 and the audio/video storage device 28. The call daemon 36 may also be used to schedule hardware where conference calls are pre-scheduled, for example. A router daemon 38 is a surrogate controller module, i.e., a remote GUI, for commands coming from other network servers. A network daemon 42 provides connection to remote interactive multimedia systems, i.e., node to node communication, and finds out what resources are available at the respective nodes. The network daemon 42 passes over to the router daemon 38 control of resources at the remote node. The router and network daemons 38, 42 provide server to server communication. The router, call and network daemons 36, 38, 42 as well as the controllers 34 all share a common memory 40. The memory 40 contains memory maps for the various hardware devices of the interactive multimedia system, for example memory maps for the router 22, the audio/video storage device 28, the quad splitter 26 and the desktop viewing stations 16. These memory maps contain parameter and configuration information about the various resources. The memory 40 also includes mutual exclusive locks (MUTEX) that lock out the memory to other stations 16 while one station is accessing a resource. Finally there is a process memory map in the memory 40 which is a working memory for the various routines. The controller modules 34 and the router daemon 38 access the router 22, the audio/video storage device 28, communication ports and a data base, with the controller modules controlling local resources and the router daemon controlling local resources on behalf of the remote client on the remote network.

Figure 3:
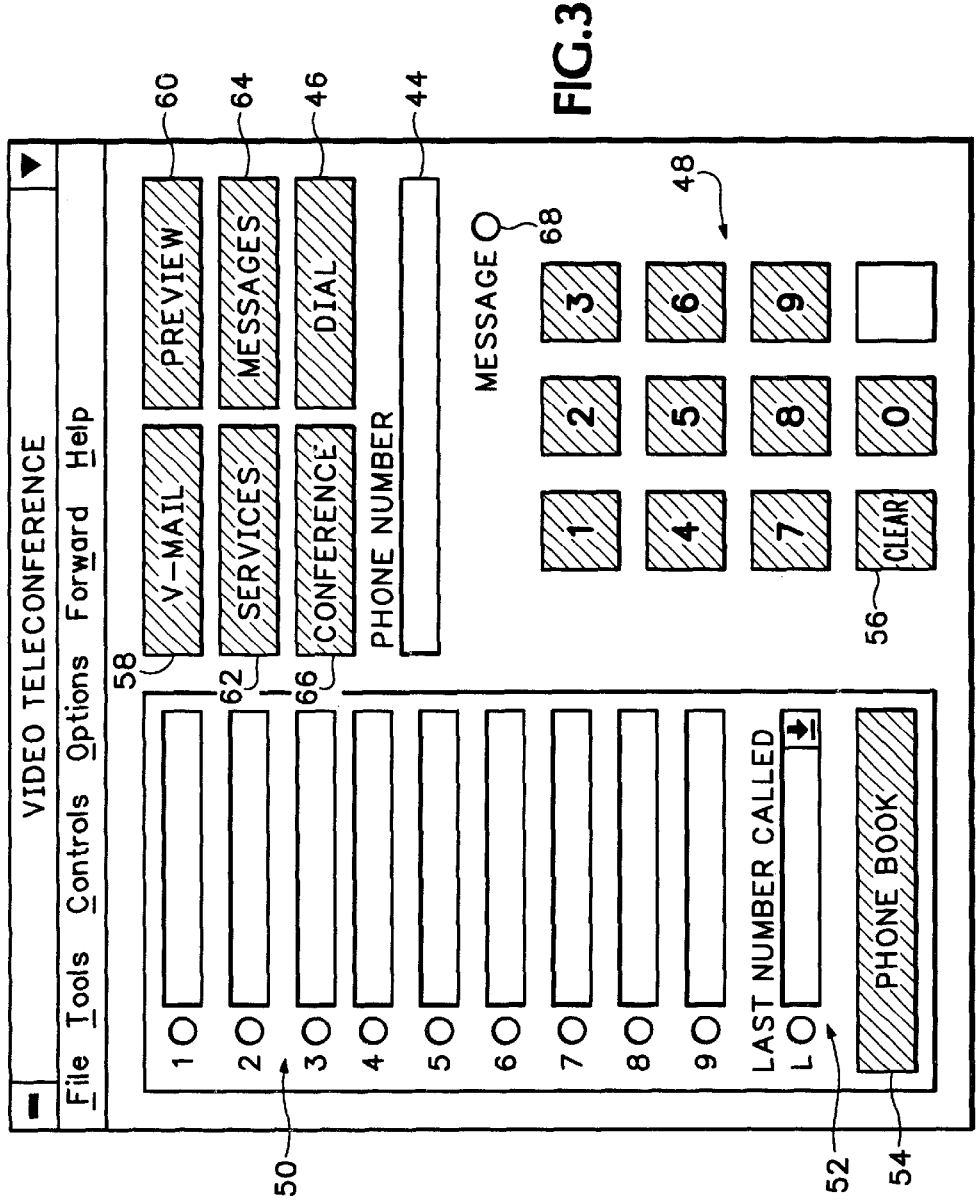
FIG. 3 is a plan view of a display screen for initiating a call over the interactive multimedia system according to the present invention.

In operation a user at a desktop viewing station 16 accesses the video teleconferencing application conventionally, such as clicking with the mouse on an icon which is displayed as part of the network operating system program display. The GUI 32 provides an initial screen on the display, such as that shown in FIG. 3, from which the user initiates a call to another user over the interactive multimedia system. The initial screen has a Phone Number bar 44 which may be directly selected by the mouse, and the desired telephone number may be entered via the keyboard. Once the telephone number has been entered, a Dial button 46 is activated to begin a video call. Alternatively the telephone number may be selected using the displayed numeric keypad 48, either using the mouse or by contact with the screen if a touch sensitive screen is implemented. Another technique is to use the speed dial feature 50 where names or representative alpha-numeric symbols are displayed for those numbers most frequently dialed. Also the last few numbers, such as ten numbers, may be retained by the Last Number Called button 52 which allows for rapid redial. Finally a Phone Book button 54 provides access to a phone book database via the controller 34 where names may be searched alphabetically to obtain the proper telephone number, and then activated. However the telephone number is selected, it appears in the Phone Number box 44 and is executed by activating the Dial button 46. A Clear button 56 may be used to clear any telephone number in the Phone Number box 44. Numbers in the speed dial boxes 50 may be changed via the Options menu.

Other buttons available to the user are a V-Mail button 58 that allows the user to access any stored, personal video mail messages. Personal video mail is protected by a password which serves as an address to an individual's own reserved mail portion of the audio/video storage system 28. Additionally a Preview button 60 allows the user to see him/herself prior to making the call, a Services button 62 allows access to various video inputs, such as CATV, financial services, video feeds and the like, a Messages button 64 accesses recorded messages that are available to everyone, such as CEO messages, corporate training videos, personnel messages and the like, and a Conference button 66 invokes a conference call popup menu. Finally a message light 68 is provided that alerts the user to the presence of v-mail stored on the audio/video storage device 28, with a bright light indicating new v-mail, a dim light indicating read and saved v-mail, and no light indicating no v-mail.

Once the user initiates the call by activating the Dial button 46, the network server 12 via the controller 34 then performs several functions. The network server 12 checks the validity of the video phone number, and returns an error message to the user and returns to the initial screen if the number is invalid. If the number is valid, the network server 12 gets the machine address of the desired video phone number and determines if the number is busy. If the desired video phone is busy, the network server 12 sends the caller a video mail greeting message from the audio/video store 28 used by the receiver, at which point the user may leave a video mail message that is stored on the receiver's audio/video store in the receiver's personal V-mail location. If the desired video phone number is available, the network server 12 allocates the necessary hardware resources to complete the call, noting the acquisition of the hardware in a log. The network server 12 then updates the desired parties' system profiles, via memory maps, to indicate that the resources and ports are currently allocated, and therefore busy, so that other users do not access the same video phone number, and rings the desired video phone. If there is no answer, the network server 12 sends the user to video mail. At which point the user may record a message on the receiver's audio/video storage device 28. If the call is accepted, audio/video data from the user's desktop viewing station 16 is routed by the router 18 to the desired video phone number where it is provided via the controller 34 and GUI 32 to the person called on their desktop viewing station 16. Also the allocated resources are noted in the memory maps, which blocks others until those resources are freed. For desktop viewing stations 16 on the same server, the audio/video data is transferred from the user's station via the hub 30 to the receiver's station under control of the respective control modules 34. For viewing stations 16 on different nodes, the audio/video data is transfered from the user's desktop viewing station via the hub 30 to the router 22, and then via appropriate codecs 24 to the codecs at the receiver's node under control of the respective router and network daemons 38, 42. At the receiver's node the audio/video data is routed by the router 22 via the hub 30 to the receiver's station 16. Likewise the audio/video data from the desired video phone number also is routed via the router 22 to the user's desktop viewing station 16, although the receiver may block the video or audio if desired at the receiver's desktop viewing station. The router daemon 38 acts on behalf of remote clients to update the memory maps and complete the connection for the remote client, in the same manner that the controller module 34 acts for local clients. When a call is made, but not completed, and the user leaves a v-mail message, the controller 34 at the receiver's desktop viewing station 16 provides a message to the GUI 32 from the network server 12 that there is mail waiting by checking the database for new messages, and toggling the message light 68 accordingly to indicate that there is new mail. The receiver can then access the video mail from the audio/video store 28.

Figure 4:
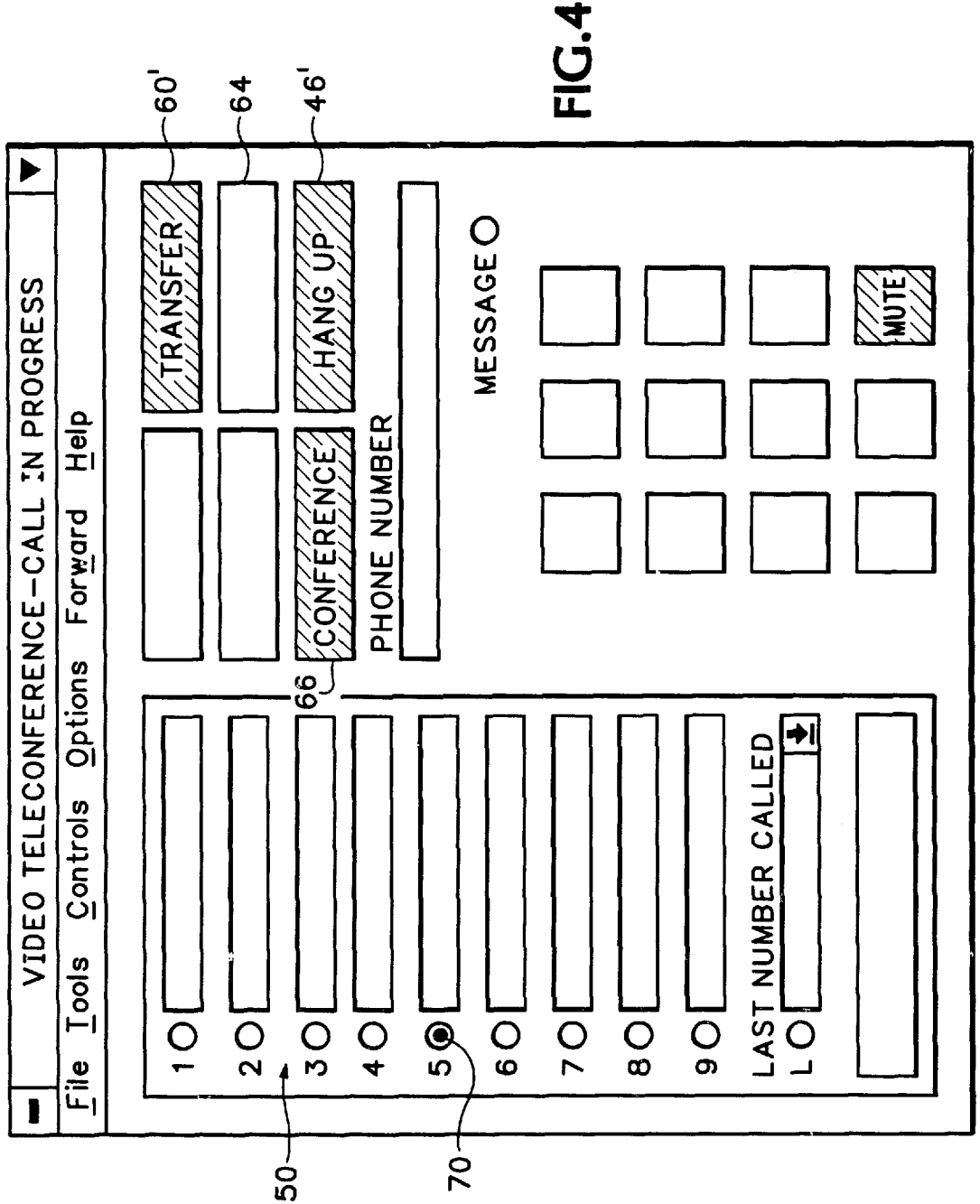
FIG. 4 is a plan view of a display screen for a call in progress for the interactive multimedia system according to the present invention.

Once the connection is made between the two desktop viewing stations 16, the GUI 32 provides the Call In Progress screen, as shown in FIG. 4. The darkened indicator 70 in the speed dial area 50 indicates that speed dial #5 is the telephone number that was selected. The Conference button 66 is still available to call the conference popup menu. The Preview button becomes a Transfer button 60' which the user may use to transfer the call to another number. The Dial button becomes a Hangup button 46' for terminating the call. Also a Mute button 72 is available for turning off the microphone at the user's station 16.

Figure 5:
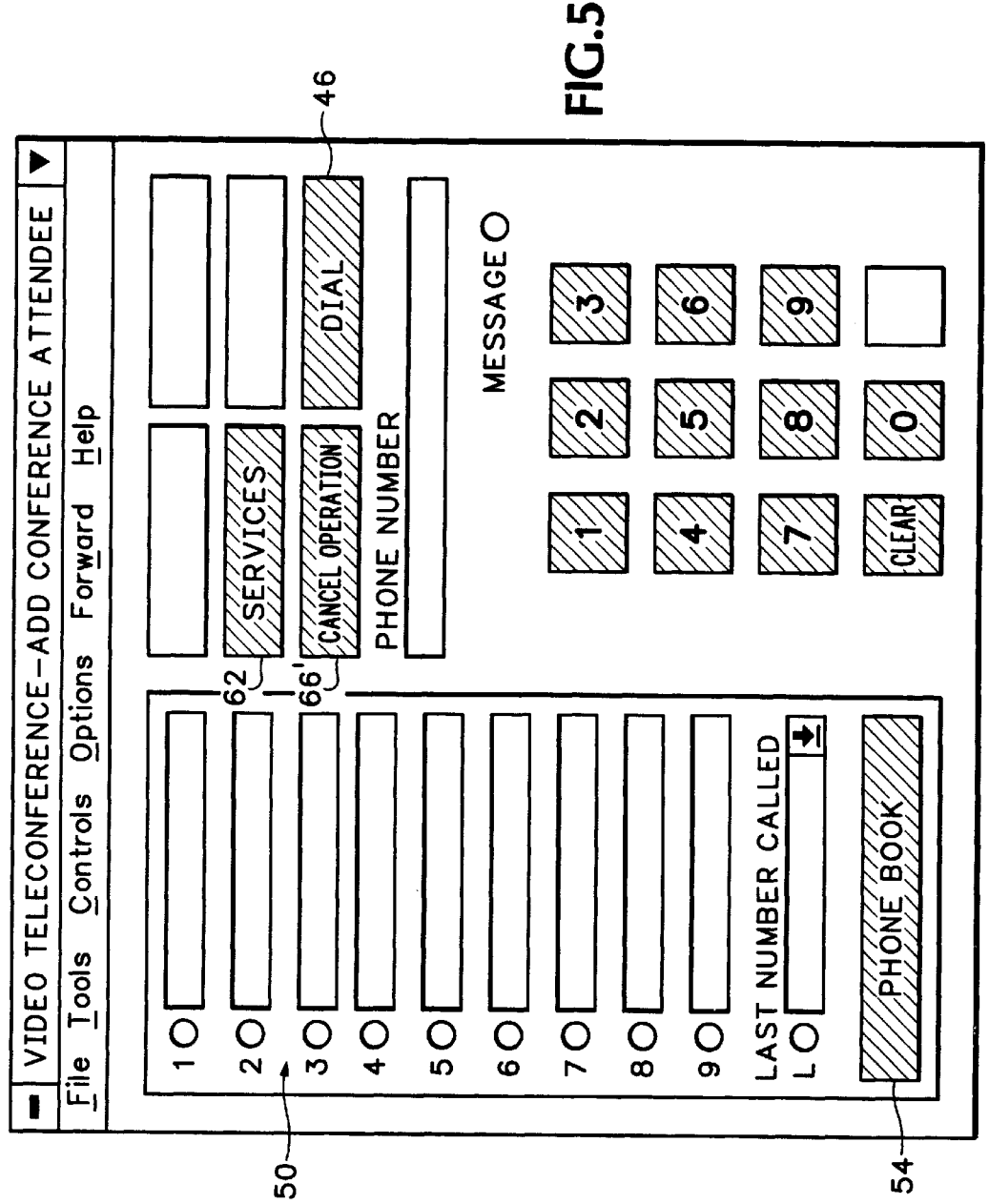
FIG. 5 is a plan view of a display screen for teleconferencing over the interactive multimedia system according to the present invention.
Figure 6:
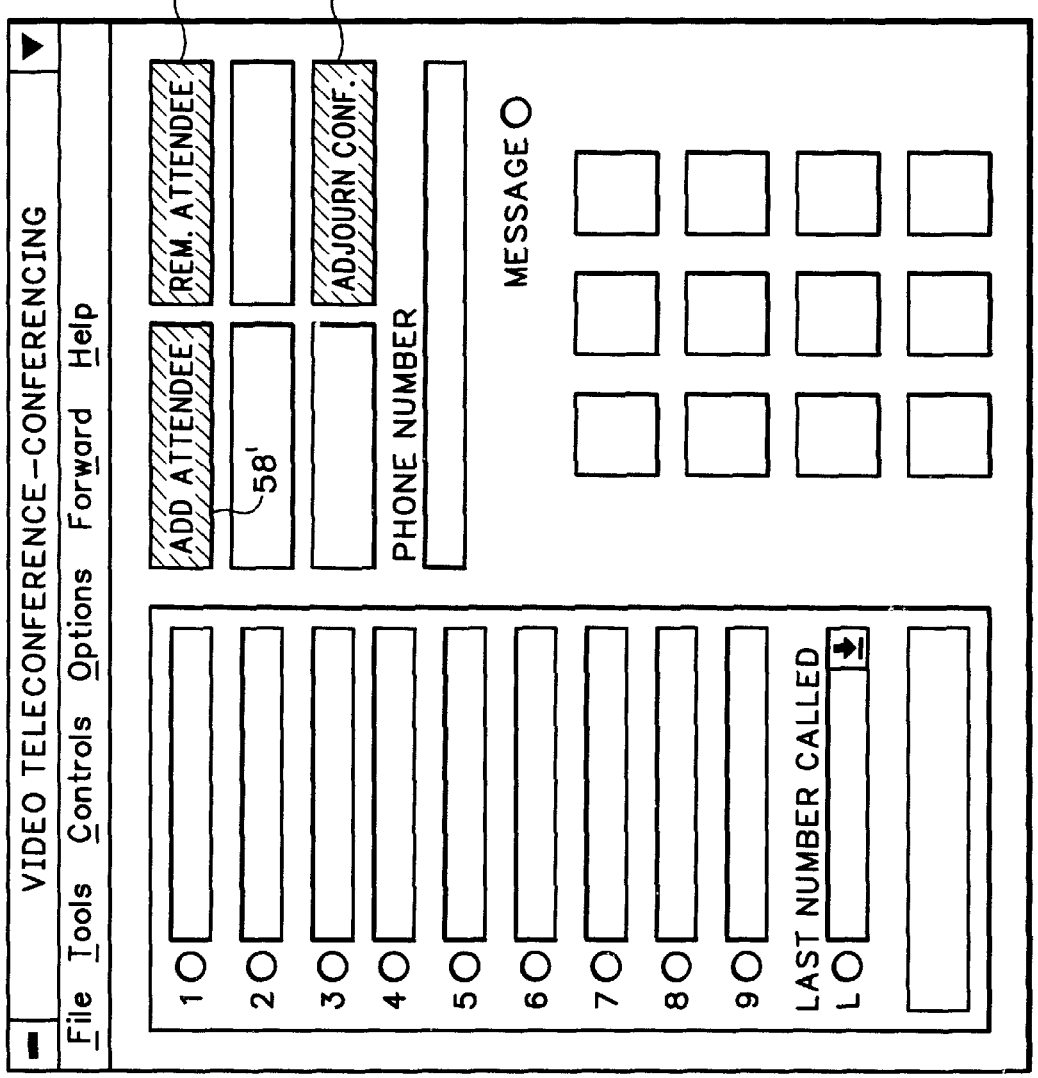
FIG. 6 is a plan view of another display screen for teleconferencing over the interactive multimedia system according to the present invention.

From the conference popup menu there are three options—add immediate, begin a scheduled call and schedule a conference call. The scheduling of a conference call reserves the resources that will be required so that when the scheduled time arrives, the resources are automatically setup by the call daemon 36 for the scheduled conference call, terminating use by others. Beginning a conference call is initiated usually from the initial screen. Adding another party to initiate a conference call on an ad hoc basis may be done at any time during a call. For the conference call the quad splitter 26 is selected by the network server 12 as part of the hardware configuration. This allows more than two parties to be connected into the same call and appear simultaneously at the user's desktop viewing station 16. The audio/video data from the desktop viewing stations 16 that are involved in the conference call are connected via the router 22 to the quad splitter 26 where they are composited into a single video signal in the form of a window split between the conference callers. This composited video signal is then input back to the router 18 and routed back to the respective desktop viewing stations 16. The screen, as shown in FIG. 5, is provided to the user by the GUI 32, and the user has all of the dial functions available. The Conference button becomes a Cancel Operation button 66' for terminating the add attendee attempt without dropping any of the existing attendees. Once the conference is successfully initiated, the conferencing screen is provided by the GUI, as shown in FIG. 6. The Dial button becomes an Adjourn Conference button 46" which serves to hangup on all attendees when activated. The V-Mail button becomes an Add Attendee button 58' and the Preview button becomes a Remove Attendee button 60".

Figure 7:
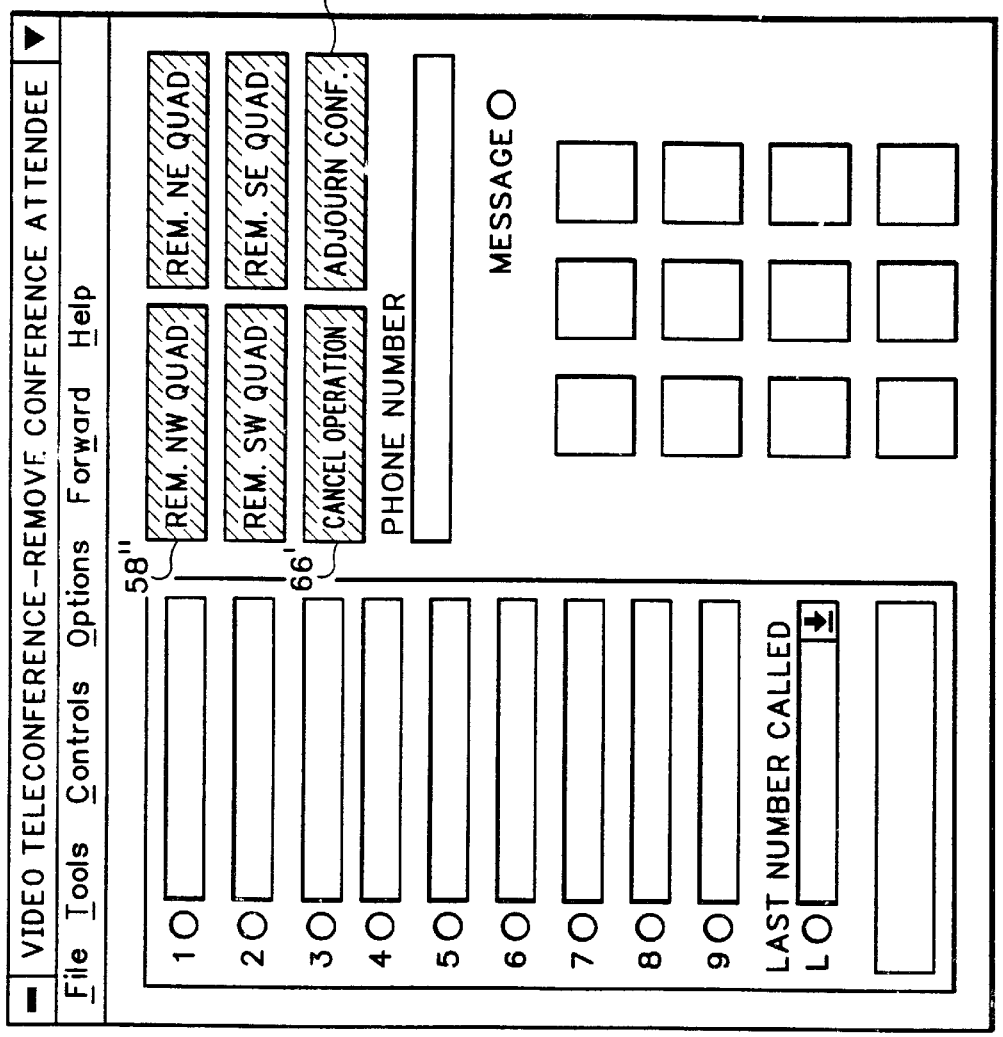
FIG. 7 is a plan view of a display screen for removing attendees to a teleconference on the interactive multimedia system according to the present invention.

When the Remove Attendee button 60" is activated, the remove attendee screen of FIG. 7 is displayed by the GUI 32. As indicated by the buttons the user has the options of removing the attendee represented in the top left quadrant of the video from the quad splitter 26, the top right quadrant, the bottom left quadrant or the bottom right quadrant, as well as adjourning the conference or canceling the remove operation. If the top right attendee is to be dropped, then the Remove NE Quadrant button 58" is activated, and the controller module 34 configures the router 22 to drop the one signal, while the remaining signals continue to be routed to the quad splitter 26 and then back to the user as a single window with only the remaining attendees. Of course now a new attendee may be added to the conference call if desired.

Thus the present invention provides an interactive multimedia audio/video communications system that allows for video calling including video conferencing using up to broadcast quality video, the video being handled on a separate, higher data rate, deterministic audio/video network from the graphics/command network, which is a lower data rate, non-deterministic transport medium, so that the graphics/command network is free for normal graphics network applications simultaneously with the video conferencing while high quality audio/video is provided over the audio/video network.

What is claimed is:

1. An interactive multimedia audio/video communications system comprising:

a graphics/command network;

an audio/video network;

means coupled to the respective networks for selectively switching a plurality of audio/video signals input from the audio/video network to a plurality of output terminals in response to commands received on the graphics/command network;

means coupled to the respective networks via one of the output terminals of the selectively switching means to selectively playback and record the audio/video signals over the audio/video network in response to control commands received over the graphics/command network;

a plurality of viewing stations coupled to the respective output terminals of the selectively switching means to receive and transmit audio/video signals, and coupled to the graphics/command network to transmit and receive commands; and means coupled to the graphics/command network for transmitting and receiving commands to/from the selectively switching means, the plurality of viewing stations, and the playing back and recording means, the transmitting and receiving means setting up the respective networks according to requests received from users at the plurality of viewing stations.

2. The system as recited in claim 1 further comprising a codec farm coupled to the selectively switching means as part of the audio/video network and coupled to the graphics/command network for receiving commands for coupling the system to a remote interactive multimedia audio/video communications system.

3. The system as recited in claims 1 or 2 further comprising a video splitter coupled to a specified number of the output terminals of the selectively switching means for combining audio/video signals from the specified number of output terminals into a single windowed audio/video signal for input to the selectively switching means.

4. The system as recited in claims 1 or 2 wherein the graphics/command network comprises a lower data rate, non-deterministic transport medium and the audio/video network comprises a higher data rate, deterministic transport medium.

* * * * *

UNITED STATES PATENT AND TRADEMARK OFFICE
CERTIFICATE OF CORRECTION

PATENT NO. : 6,404,811 B1
DATED : June 11, 2002
INVENTOR(S) : John F. Cvetko et al.

It is certified that error appears in the above-identified patent and that said Letters Patent is hereby corrected as shown below:

<u>Title page,</u>
Item [*] Notice, delete "869" and insert -- 868 --.

Signed and Sealed this

Thirtieth Day of March, 2004

JON W. DUDAS
*Acting Director of the United States Patent and Trademark Office*